(12) United States Patent
Jeon et al.

(10) Patent No.: US 10,123,047 B2
(45) Date of Patent: Nov. 6, 2018

(54) METHOD AND APPARATUS FOR IMAGE ENCODING/DECODING

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Kwang Hyun Won, Bucheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/887,062

(22) Filed: Feb. 2, 2018

(65) Prior Publication Data

US 2018/0160148 A1 Jun. 7, 2018

Related U.S. Application Data

(63) Continuation of application No. 14/990,608, filed on Jan. 7, 2016, now Pat. No. 10,021,422, which is a
(Continued)

(30) Foreign Application Priority Data

Feb. 28, 2013 (KR) .................. 10-2013-0022145
Mar. 8, 2013 (KR) .................. 10-2013-0024978

(51) Int. Cl.
*G06K 9/36* (2006.01)
*H04N 19/61* (2014.01)
(Continued)

(52) U.S. Cl.
CPC ............ *H04N 19/61* (2014.11); *H04N 19/12* (2014.11); *H04N 19/14* (2014.11);
(Continued)

(58) Field of Classification Search
CPC ........ H04N 5/85; H04N 9/8042; H04N 5/772; H04N 9/8063; H04N 9/8205;
(Continued)

(56) References Cited

U.S. PATENT DOCUMENTS 5,461,421 A 10/1995 Moon
8,244,048 B2 8/2012 Sohn et al.
9,247,255 B2 1/2016 Jeon et al.

FOREIGN PATENT DOCUMENTS

KR 10-2012-0035126 A 4/2012

OTHER PUBLICATIONS

Korean Office Action dated Feb. 5, 2014, in counterpart Korean Application No. 10-2013-0024978 (4 pages, in Korean).

*Primary Examiner* — Duy M Dang
(74) *Attorney, Agent, or Firm* — NSIP Law

(57) ABSTRACT

Disclosed are a method and an apparatus for image encoding/decoding. The method for image decoding includes comparing whether a size of a current transform block and a size of a smallest transform block (smallest transform unit (STU)) are the same as each other, and decoding information indicating whether transformation is performed on the current transform block and determining whether to perform inverse transformation on the current transform block based on the decoded information indicating whether the transformation is performed when the size of the current transform block and the size of a smallest transform block are the same as each other.

19 Claims, 4 Drawing Sheets

Related U.S. Application Data continuation of application No. 14/191,976, filed on Feb. 27, 2014, now Pat. No. 9,247,255.

(51) Int. Cl.
*H04N 19/176* (2014.01)
*H04N 19/12* (2014.01)
*H04N 19/14* (2014.01)
*H04N 19/154* (2014.01)
*H04N 19/157* (2014.01)
*H04N 19/625* (2014.01)
*H04N 19/91* (2014.01)

(52) U.S. Cl.
CPC ......... *H04N 19/154* (2014.11); *H04N 19/157* (2014.11); *H04N 19/176* (2014.11); *H04N 19/625* (2014.11); *H04N 19/91* (2014.11)

(58) Field of Classification Search
CPC .... H04N 21/235; H04N 21/435; H04N 21/84; H04N 5/765; H04N 21/23602
See application file for complete search history.

METHOD AND APPARATUS FOR IMAGE ENCODING/DECODING

CROSS-REFERENCE TO RELATED APPLICATIONS

This application is a continuation of U.S. patent application Ser. No. 14/990,608 filed on Jan. 7, 2016, which is a continuation of U.S. patent application Ser. No. 14/191,976 filed on Feb. 27, 2014 and issued as U.S. Pat. No. 9,247,255, which claims the benefit under 35 U.S.C. § 119(a) of Korean Patent Application No. 10-2013-0022145 filed on Feb. 28, 2013 in the Korean Intellectual Property Office, and Korean Patent Application No. 10-2013-0024978 filed on Mar. 8, 2013 in the Korean Intellectual Property Office, the entire disclosures of which are incorporated herein by reference for all purposes.

BACKGROUND OF THE INVENTION

Field of the Invention

The present invention relates to image encoding/decoding, and more particularly, to a method and an apparatus for encoding/decoding an image by determining whether to transform the image.

Related Art

In recent years, a demand for high-resolution and high-quality images such as a high definition (HD) image and an ultra high definition (UHD) image has increased in various application fields. As image data has high resolution and high quality, data quantities are relatively increased as compared with the existing image data, and as a result, when image is transmitted by using a medium such as the existing wired/wireless wideband line or the image data is stored by using the existing storage medium, transmission cost and storage cost are increased. In order to solve the problems which occur as the image data has high resolution and high quality, high-efficiency image compression technologies may be used.

The image compression technologies include various technologies including an inter prediction technology of predicting a pixel value included in a current picture from a picture before or after the current picture, an intra prediction technology of predicting the pixel value included in the current picture by using pixel information in the current picture, an entropy coding technology of allocating a short symbol of which an appearance frequency is high and allocating a long symbol of which the appearance frequency is low, and the like, and the image data is effectively compressed to be transmitted or stored by using the image compression technology.

SUMMARY OF THE INVENTION

An object of the present invention is to provide a method and an apparatus for image encoding/decoding that can improve encoding/decoding efficiency.

Another object of the present invention is to provide a method and an apparatus that determine whether to transform an image based on a size of a smallest transformation block capable encoding/decoding efficiency.

In accordance with an embodiment of the present invention, there is provided a method for image decoding. The method includes comparing whether a size of a current transform block and a size of a smallest transform block (smallest transform unit (STU)) are the same as each other, and decoding information indicating whether transformation is performed on the current transform block and determining whether to perform inverse transformation on the current transform block based on the decoded information indicating whether the transformation is performed when the size of the current transform block and the size of the smallest transform block are the same as each other, the smallest transform block is a transform block having the minimum size determined by an encoder.

In the determining of whether to perform the inverse transformation on the current transform block, when the information indicating whether the transformation is performed indicates that the transformation is not performed, the inverse transformation of the current transform block may be skipped.

In the determining of whether to perform the inverse transformation on the current transform block, when the information indicating whether the transformation is performed indicates that the transformation is performed, the inverse transformation of the current transform block may be performed.

The size of the smallest transform block may be larger than a size of 4×4.

The method may further include decoding information on a flag indicating whether to use a function to determine whether to perform inverse transformation on the current transform block based on the size of the smallest transform block, whether to perform the inverse transformation on the current transform block may be determined by referring to the size of the smallest transform block when the flag information indicates that the function to determine whether to perform the inverse transformation on the current transform block based on the size of the smallest transform block is used, and whether to perform the inverse transformation on the current transform block having the size of 4×4 may be determined when the flag information indicates that the function to determine whether to perform the inverse transformation on the current transform block based on the size of the smallest transform block is not used.

The method may further include performing inverse transformation on the current transform block when the size of the current transform block and the size of the smallest transform block are not the same as each other.

In accordance with another embodiment of the present invention, there is provided an apparatus for image decoding. The apparatus include an entropy decoding module entropy-decoding information indicating a size of a smallest transform block and whether transformation is performed, and an inverse transformation module comparing whether the size of the smallest transform block and a size of a current transform block are the same as each other and determining whether to perform inverse transformation on the current transform block based on the information indicating whether the transformation is performed when the size of the smallest transform block and the size of the current transform block are the same as each other, the smallest transform block is a transform block having the minimum size determined by an encoder.

In accordance with yet another embodiment of the present invention, there is provided a method for image encoding. The method include comparing whether a size of a current transform block and a size of a smallest transform block (smallest transform unit (STU)) are the same as each other, and determining whether to perform transformation on the current transform block when the size of the current transform block and the size of the smallest transform block are the same as each other, the smallest transform block is a transform block having the minimum size determined by an encoder.

In the determining of whether to perform the transformation on the current transform block, information indicating whether the transformation is performed on the current transform block may be encoded according to the determination.

The size of the smallest transform block may be larger than a size of 4×4.

In the determining of whether to perform the transformation on the current transform block, when it is determined that the transformation of the current transform block is not performed, the information may indicate that the transformation of the current transform block is skipped.

In the determining of whether to perform the transform on the current transform block, when it is determined that the transformation of the current transform block is performed, the information may indicate that the transformation of the current transform block is performed and the transformation of the current transform block is performed.

The method may further include performing transformation on the current transform block when the size of the current transform block and the size of the smallest transform block are not the same as each other.

The method may further include encoding information on a flag indicating whether to use a function to determine whether to perform transformation on the current transform block based on the size of the smallest transform block, whether to perform the transformation on the current transform block may be determined by referring to the size of the smallest transform block when the flag information indicates that the function to determine whether to perform the transformation on the current transform block based on the size of the smallest transform block is used, and whether to perform the transformation on the current transform block having the size of 4×4 may be determined when the flag information indicates that the function to determine whether to perform the transformation on the current transform block based on the size of the smallest transform block is not used.

In accordance with still another embodiment of the present invention, there is provided an apparatus for image encoding. The apparatus includes a transformation module comparing whether a size of a current transform block and a size of a smallest transform block are the same as each other, and determining whether to perform transformation on the current transform block when the size of the current transform block and the size of the smallest transform block are the same as each other, and an entropy encoding module entropy-encoding information indicating whether transformation is performed on the current transform block according to the determination of the transformation module, the smallest transform block is a transform block having the minimum size determined by an encoder.

Whether to transform a current transformation block is determined based on a size of the smallest transformation block and the determined information is efficiently signaled to increase encoding efficiency and improve a subjective image quality.

If degree of spatial change of pixel values in a corresponding block to be compressed in the image is very large or very sharp, and as a result, degree in which image energy concentrates on low frequencies in spite of transformation is not significant and when serious image quality deterioration is caused by primarily maintaining low-frequency components and removing high-frequency components or strongly applying quantization during a compression process, whether to perform transformation may be determined based on the size of the smallest transformation block without large overhead by judgment of an encoder to increase image compression rate and minimize image quality deterioration.

DESCRIPTION OF EXEMPLARY EMBODIMENTS

Hereinafter, embodiments of the present invention will be described in detail with reference to the drawings. In describing the embodiments of the present specification, when it is determined that the detailed description of the known art related to the present invention may obscure the gist of the present invention, the corresponding description thereof may be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the specification does not exclude a component other than the corresponding component and means that an additional component may be included in the embodiments of the present invention or the scope of the technical spirit of the present invention.

Terms such first, second, and the like may be used to describe various components, but the components are not limited by the terms. The above terms are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component includes respective components which are arranged for easy description and at least two components of the respective components may constitute one component or one component is divided into a plurality of components which may perform their functions. Even an integrated embodiment and separated embodiments of each component is also included in the scope of the present invention without departing from the spirit of the present invention.

Figure 1:
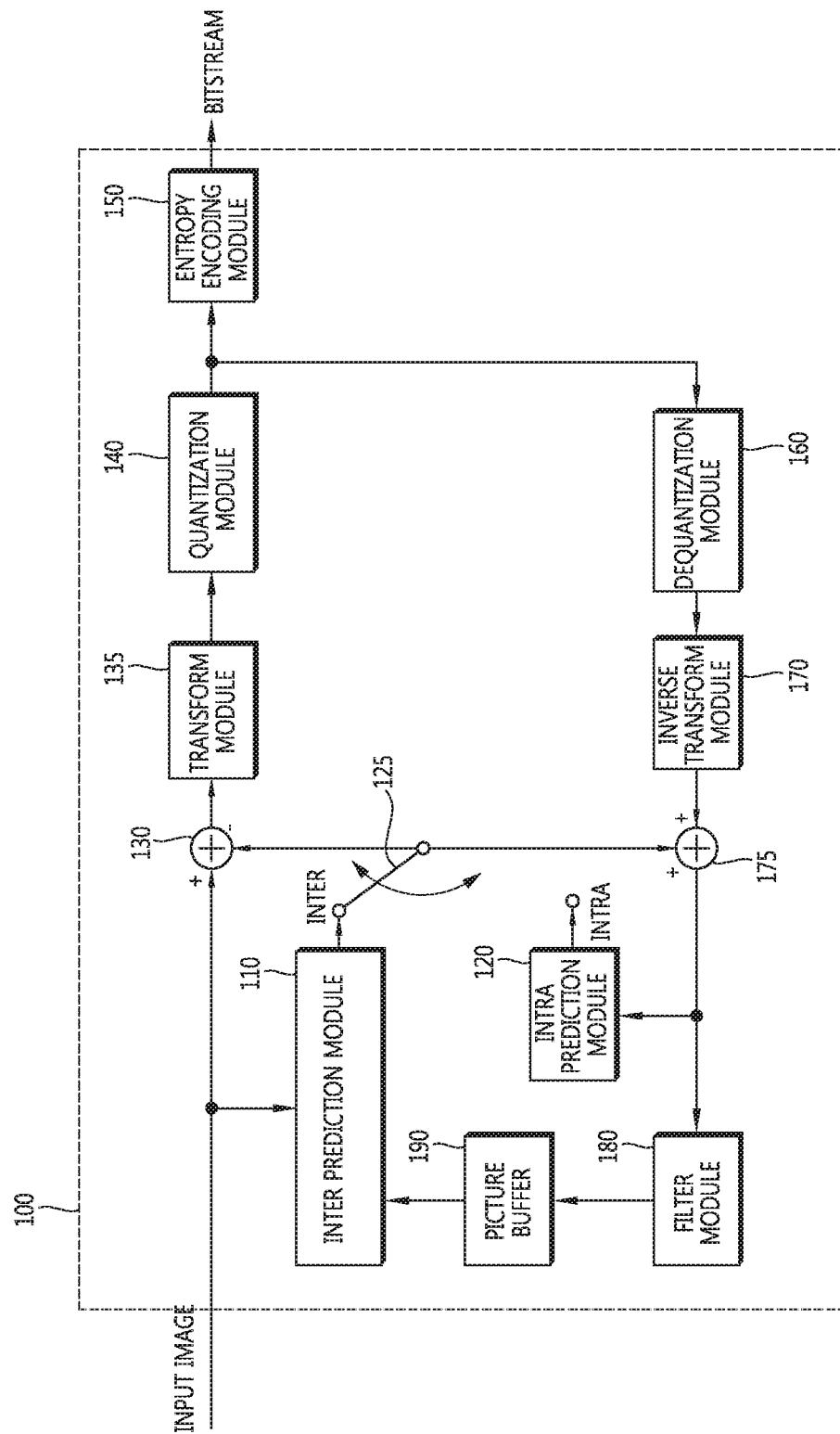
FIG. 1 is a block diagram illustrating a configuration of an apparatus for image encoding according to an embodiment of the present invention.

FIG. 1 is a block diagram illustrating a configuration of an apparatus for image encoding according to an embodiment of the present invention.

Referring to FIG. 1, an image encoding apparatus 100 includes an inter prediction module 110, an intra prediction module 120, a switch 125, a subtractor 130, a transform module 135, a quantization module 140, an entropy encoding module 150, a dequantization module 160, an inverse transform module 170, an adder 175, a filter module 180, and a picture buffer 190.

The image encoding apparatus 100 may encode an input image in an intra mode or an inter mode and output a bitstream. In the case of the intra mode, the switch 125 is switched to 'intra', and in the case of the inter mode, the switch 125 is switched to 'inter'. The image encoding apparatus 100 may generate a prediction block for an input block of the input image and thereafter, encode a residual between the input block and the prediction block.

In the case of the intra mode, the intra prediction module 120 may perform a spatial prediction by using a pixel value of a pre-encoded block around a current block to generate the prediction block.

In the case of the inter mode, the inter prediction module 110 may acquire a motion vector by finding an area corresponding to the input block in a reference image stored in the picture buffer 190 during a motion estimation process. The inter prediction module 110 may perform a motion compensation by using the motion vector and the reference image stored in the picture buffer 190 to generate the prediction block.

The subtractor 130 may generate a residual block by a residual between the input block and the generated prediction block. The transform module 135 may transform the residual block to output a transform coefficient. And the quantization module 140 may quantize the input transform coefficient according to a quantization parameter to output a quantized coefficient.

The entropy encoding module 150 may perform entropy encoding based on values calculated by the quantization module 140 or an encoded parameter value calculated during encoding to output the bitstream.

Since the image encoding apparatus 100 performs inter prediction encoding, the current encoded image needs to be decoded and stored for use as the reference image. Accordingly, the quantized coefficient may be inversely quantized in the dequantization module 160 and inversely transformed in the inverse transform module 170. The inversely quantized and inversely transformed coefficient is added to the prediction block by the adder 175, whereby a reconstructed block is generated.

The reconstructed block passes though the filter module 180, and the filter module 180 may apply at least one or more of a deblocking filter, a sample adaptive offset (SAO), and an adaptive loop filter (ALF) to the reconstructed block or a reconstructed picture. The reconstructed block which passes through the filter module 180 may be stored in the picture buffer 190.

Figure 2:
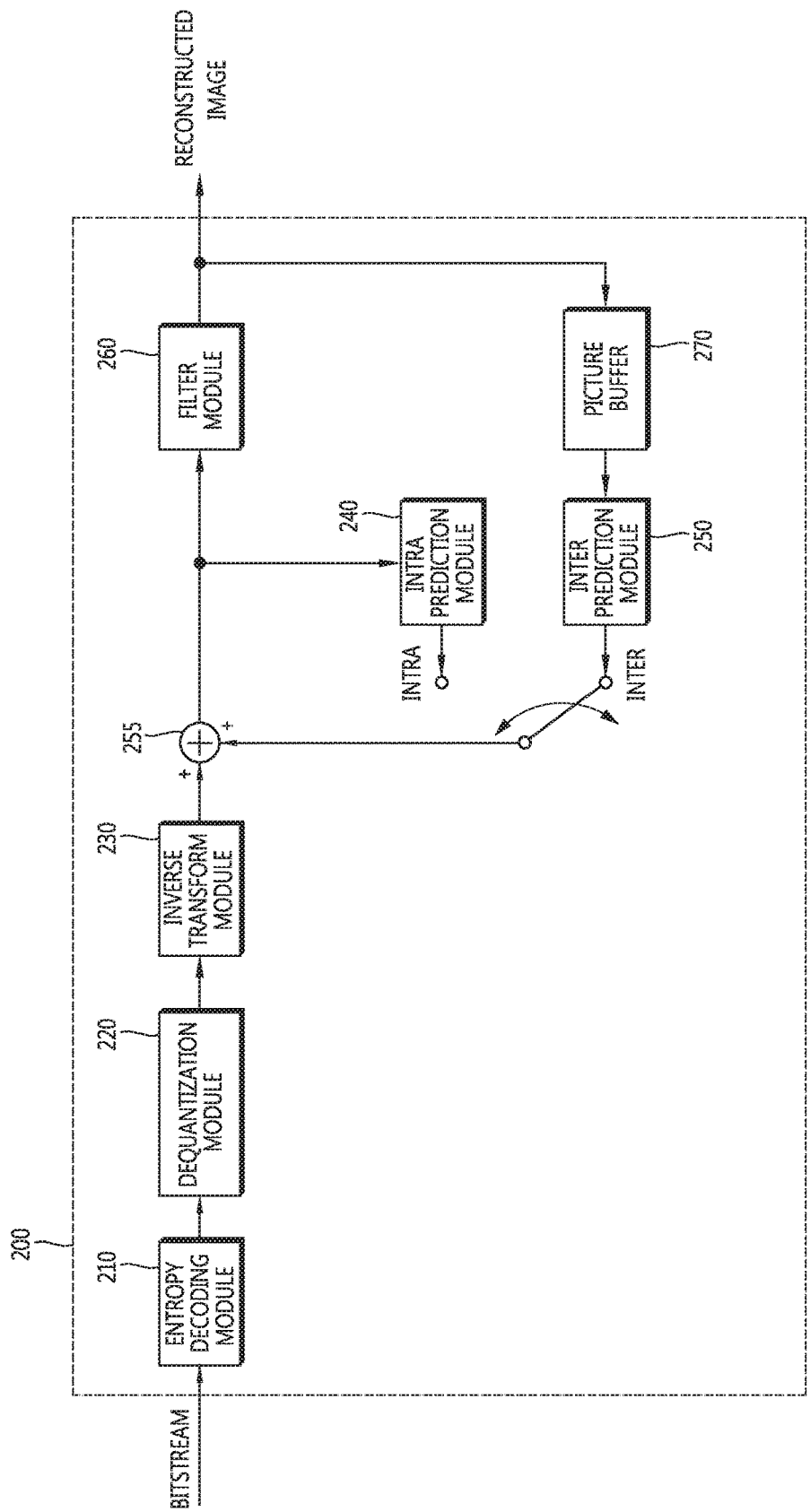
FIG. 2 is a block diagram illustrating a configuration of an apparatus for image encoding according to an embodiment of the present invention.

FIG. 2 is a block diagram illustrating a configuration of an apparatus for image decoding according to an embodiment of the present invention.

Referring to FIG. 2, the image decoding apparatus 200 includes an entropy decoding module 210, a dequantization module 220, an inverse transform module 230, an intra prediction module 240, an inter prediction module 250, a filter module 260, and a picture buffer 270.

The image decoding apparatus 200 may receive a bitstream output from the encoding apparatus, perform decoding the bitstream in an intra mode or an inter mode and output a reconfigured image, that is, a reconstructed image. In the case of the intra mode, the switch may be switched to 'intra', and in the case of the inter mode, the switch may be switched to 'inter'.

The image decoding apparatus 200 may acquire a reconstructed residual block from the received bitstream, and generate a prediction block and thereafter, a block reconfigured by adding the reconstructed residual block and the prediction block, that is, a reconstructed block.

The entropy decoding module 210 may entropy-decode the received bitstream according to a probability distribution. A quantized (transformed) coefficient may be generated by the entropy decoding.

The quantized coefficient is inversely quantized in the dequantization module 220 and inversely transformed in the inverse transform module 230, and as a result of dequantization/inverse-transformation of the quantized coefficient, the reconstructed residual block may be generated.

In the case of the intra mode, the intra prediction module 240 may perform a spatial prediction by using a pixel value of a pre-encoded block around a current block to generate the prediction block.

In the case of the inter mode, the inter prediction module 250 may perform motion compensation by using a motion vector and a reference image stored in the picture buffer 270 to generate the prediction block.

The reconstructed residual block and the prediction block may be added through an adder 255, and the added blocks may pass through the filter module 260. The filter module 260 may apply at least one of a deblocking filter, an SAO, and an ALF to the reconstructed block or the reconstructed picture. The filter module 260 may output a reconfigured image, that is, a reconstructed image. The reconstructed image may be stored in the picture buffer 270 to be used in an inter prediction.

Hereinafter, the block may mean a unit of image encoding and decoding. Therefore, in the specification, the block may mean a coding unit (CU), a prediction unit (PU), a transform unit (TU), and the like in some cases. In the specification, an encoding/decoding target block may be used as a meaning including both transform/inverse transform target block when transform/inverse transform is performed and a prediction target block when a prediction is performed.

Meanwhile, in the image compression technology in the related art, a residual signal corresponding to a difference value between an original block and the prediction block is always transformed and encoded. However, when degree of spatial change of pixel values in a corresponding block to be compressed is very large or very sharp, a degree in which image energy concentrates on low frequencies is not large in spite of performing the transform and significant image quality deterioration may be caused when low-frequency components are primarily maintained and high-frequency components are removed or quantization is strongly applied during a compression process. In particular, a probability that such a problem will occur is higher in the case of an artificial image made by a computer. In this case, when the residual is immediately encoded in a spatial area without transformation depending on a characteristics of the image rather than indiscriminately transforming the residual signal like the existing method, compression performance may be improved or image quality deterioration may be remarkably reduced.

In order to solve such a problem, in high efficiency video coding (HEVC) technology which is being standardized at present, when the size of a transform block (TB) or a transform unit (TU) is smallest, that is, the size of the transform block is 4×4, encoding may be performed without a transformation process by determining whether to transform a transform block having a size of 4×4. Accordingly, a transformation process shall not be skipped in a transform block having a larger size than 4×4 and only in the case of the size of 4×4, the transformation process may be selectively skipped.

Meanwhile, in the present image compression technology, a minimum size of a transform block may be determined independently for each encoder. For example, in a specific application, a minimum size of a transform block may be determined as not 4×4 but 8×8 or 16×16. When the minimum size of a transform block determined by the encoder is 8×8 or more, transformation needs to be always performed in the present HEVC technology. Accordingly, when the present HEVC technology is applied, the transformation process is always performed even though it is advantageous that the transformation process is skipped because transform efficacy of the block in the image deteriorates, a problem in which the compression rate decreases or the image quality deterioration is caused occurs.

In order to solve the problems, the present invention provides a method that the transformation process may be skipped by determining whether to perform the transformation even though the minimum size of the transform block determined by the encoder is variable. Hereinafter, the specification, a transform block having the minimum size determined by the encoder is referred to as a smallest transform block (STU).

Figure 3:
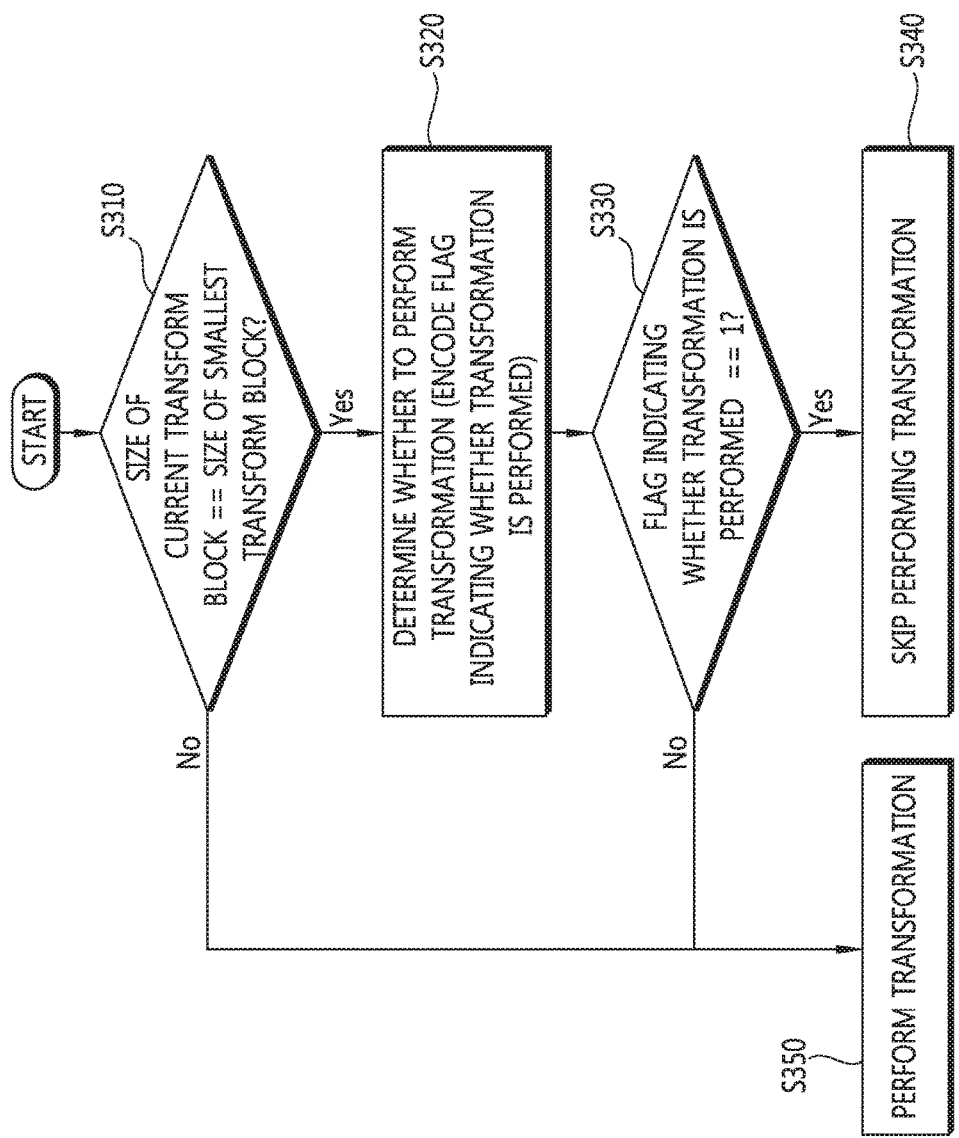
FIG. 3 is a flowchart schematically illustrating a method for encoding an image by determining whether to perform transformation based on a size of a smallest transformation block according to an embodiment of the present invention.

FIG. 3 is a flowchart schematically illustrating a method for encoding an image by determining whether to transform based on a size of a smallest transform block according to an embodiment of the present invention. Respective steps of FIG. 3 may be performed within the configuration corresponding to the image encoding apparatus described in FIG. 1.

The encoder may perform the intra prediction or inter prediction of a present encoding target block to generate the prediction block and thereafter, acquire a residual signal corresponding to a difference value between the present encoding target block and the prediction block. In this case, the encoder may perform a process of transforming the residual signal based on the transform block unit and the transformation process may be performed by the method illustrated in FIG. 3.

Referring to FIG. 3, the encoder may compare a current transform block size and a size of a smallest transform block (S310). That is, the encoder may determine whether the current transform block size and the size of a smallest transform block are the same as each other.

The size of a smallest transform block (STU) as the transform block having the minimum size determined by the encoder (alternatively, a user) represents a transform block size in which the transformation process may be skipped. For example, the size of a smallest transform block may be a size of 8×8, 16×16, 32×32, or the like larger than 4×4 which is the smallest size pre-determined in the present HEVC. Of course, the size of a smallest transform block may be the size of 4×4.

For example, the size of a smallest transform block may be set by using "log 2_min_transform_block_size_minus2" which is information indicating a minimum size of transform block in the present HEVC. A syntax element of "log 2_min_transform_block_size_minus2" may be set in a sequence parameter set (SPS), a picture parameter set (PPS), or a slice header to be transmitted to a decoder. Here, the size of a smallest transform block $N_{min}$ may be deduced by Equation 1 below by using "log 2_min_transform_block_size_minus2".

$$N_{min}=2^{(\log 2\_min\_transform\_block\_size\_minus2+2)} \quad \text{[Equation 1]}$$

The size of a smallest transform block (that is, STU) may be $N_{min} \times N_{min}$ by Equation 1 above.

The size N of the current transform block may be deduced by Equation 2 below by using "log 2TrafoSize" which is a variable for indicating the size of the current transform block.

$$N=2^{(\log 2TrafoSize)} \quad \text{[Equation 2]}$$

The current transform block (that is, TU) size may be N×N by Equation 2 above.

When the current transform block size and the size of a smallest transform block are the same as each other, the encoder may determine whether to transform the current transform block (S320). Here, a flag may be used in order to notify whether transform is performed on the current transform block. For example, transform_skip_flag which is the flag indicating whether transform is performed on the current transform block may be used. When a value of transform_skip_flag is 1, it may be indicated that transform is not performed but skipped on the current transform block, and when the value of transform_skip_flag is 0, it may be indicated that transform is performed on the current transform block.

By determining whether to perform the transformation, when the current transform block size and the size of a smallest transform block are the same as each other, the flag (for example, transform_skip_flag) indicating whether the transformation is performed is encoded to be transmitted to the decoder. Here, when the value of the flag (for example, transform_skip_flag) indicating whether the transformation is performed is 1 (S330), the encoder may skip transforming the current transform block (S340). If not so, the encoder may transform the current transform block (S350).

Meanwhile, as the judgment result of step S310, when the current transform block size and the size of a smallest transform block are not the same as each other, the encoder may transform the current block (S350). In this case, the flag (for example, transform_skip_flag) indicating whether the transformation is performed is not encoded and the flag information is not transmitted to the encoder.

Figure 4:
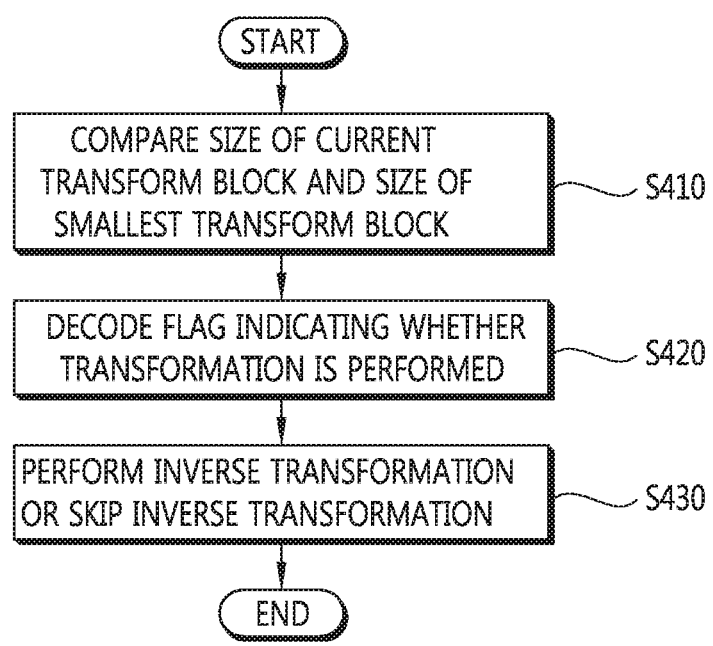
FIG. 4 is a flowchart schematically illustrating a method for decoding an image by determining whether transformation is performed based on a size of a smallest transformation block according to an embodiment of the present invention.

FIG. 4 is a flowchart schematically illustrating a method for decoding an image by determining whether transform is performed based on a size of a smallest transform block according to an embodiment of the present invention. Respective steps of FIG. 4 may be performed within the configuration corresponding to the image decoding apparatus described in FIG. 2.

Referring to FIG. 4, the decoder may compare a current transform block size and a size of a smallest transform block (S410). That is, the decoder may decode information on the size of a smallest transform block and determine whether the current transform block size and the size of a smallest transform block are the same as each other. For example, when the information on the size of a smallest transform block is stored in "log 2_min_transform_block_size_minus2", the information of "log 2_min_transform_block_size_minus2" may be decoded and thereafter, the size of a smallest transform block log 2_min_transform_block_size_minus2+2 and the current transform block size log 2TrafoSize may be compared with each other.

When the current transform block size and the size of a smallest transform block are the same as each other, the decoder may decode a flag (for example, transform_skip_flag) indicating whether the transformation is performed (S420).

The decoder may perform an inverse transformation or skip an inverse transformation process according to the decoded flag (for example, transform_skip_flag) information (S430).

For example, when the decoded flag indicates that the transformation process is skipped (for example, when a value of transform_skip_flag is 1), the decoder does not perform the inverse transformation. When the decoded flag indicates that the transformation is performed (for example, when the value of transform_skip_flag is 0), the decoder performs the inverse transformation.

Meanwhile, when the current transform block size and the size of a smallest transform block are not the same as each other, the decoder may perform the inverse transformation on the current transform block without decoding the flag (for example, transform_skip_flag) indicating whether the transformation is performed.

The present invention may provide a method that indicates whether to use a function to skip the transformation process based on a size of a smallest transform block as described in FIG. 3 and a function to skip the inverse transformation process based on a size of a smallest transform block as described in FIG. 4. For example, the encoder may use a flag that indicates whether to use the function to skip the transformation process based on a size of a smallest transform block. Since as a decoding process, an accurate inverse process to the encoding process needs to be performed, when the flag indicating whether to use the function to skip the transformation process based on a size of a smallest transform block during the encoding process indicates that the function is used, the flag represents that the function to skip the inverse transformation process is used based on a size of a smallest transform block even during the decoding process similarly. The flag information is set in the sequence parameter set (SPS), the picture parameter set (PPS), or the slice header to be transmitted to the decoder.

Table 1 below schematically illustrates one example of a case in which the encoder stores the flag information in the sequence parameter set and transmits the stored flag information to the decoder.

TABLE 1

Sequence_parameter_Set {
...
transform_skip_enabled_flag
    if( transform_skip_enabled_flag)
        min_transform_block_size_based_transform_skip_flag
...
}

Herein, min_transform_block_size_based_transform_skip_flag is a flag that indicates whether to use the function to skip the transformation process based on a size of a smallest transform block during the encoding process.

When a value of min_transform_block_size_based_transform_skip_flag is 1, the flag indicates that the decoder determines whether to perform the inverse transformation by referring to a size of a smallest transform block determined by the encoder, instead of referring to the smallest size of 4×4 pre-determined in the present HEVC at the time of determining whether to perform the inverse transformation. For example, when the encoder determines the size of 8×8 as a size of a smallest transform block, the decoder determines whether to perform the inverse transformation, thereby skipping the inverse transformation process when the transform block size is 8×8. When the value of min_transform_block_size_based_transform_skip_flag is 0, the flag indicates that the decoder determines whether to perform the inverse transformation by referring to the smallest size of 4×4 pre-determined in the present HEVC at the time of determining whether to perform the inverse transformation.

In implementing the decoding apparatus or the decoding method according to the present invention, the size of a smallest transform block to be compared with the current transform block size is calculated by an equation by referring to the value of min_transform_block_size_based_transform_skip_flag to implement the decoding apparatus or method for a simpler configuration.

That is, min_transform_block_size_based_transform_skip_flag indicates that the function to skip the inverse transformation process is used based on the size of a smallest transform block (for example, when the value of min_transform_block_size_based_transform_skip_flag is set to 1), log 2_skipTrafoSize_min indicating the size of a smallest transform block referred to at the time of determining whether to skip the inverse transformation process may be determined as illustrated in Table 2 below by using "log 2_min_transform_block_size_minus2" described above.

TABLE 2 if(min_transform_block_size_based_transform_skip_flag)
    log2_skipTrafoSize_min
        = max(2, log2_min_transform_block_size_minus2+2)
else
    log2_skipTrafoSize_min = 2

That is, when min_transform_block_size_based_transform_skip_flag is 0, the size of a smallest transform block log 2_skipTrafoSize_min referred to at the time of determining whether to skip the inverse transformation process is 2 (that is, indicates the block size of 4×4) and when min_transform_block_size_based_transform_skip_flag is 1, the size of a smallest transform block log 2_skipTrafoSize_min has a larger value of 2 and the value of log 2_min_transform_block_size_minus2+2. In this case, when the size of a smallest transform block signaled by the encoder is larger than 4×4, the value of log 2_skipTrafoSize_min becomes log 2_min_transform_block_size_minus2+2 and when the size of a smallest transform block is the same as 4×4, the value of log 2_skipTrafoSize_min becomes 2.

Table 3 below schematically illustrates one example of a process of decoding the current transform block by determining whether to perform inverse transform on the current transform block by referring to the size of a smallest transform block log 2_skipTrafoSize_min referred to at the time of determining whether to skip the inverse transformation process as described above.

TABLE 3

| residual_coding( x0, y0, log2TrafoSize, cIdx ) { | Descriptor |
|---|---|
| if( transform_skip_enabled_flag && | |
| !cu_transquant_bypass_flag | |
| && ( log2TrafoSize == log2_skipTrafoSize_min ) ) | |
| transform_skip_flag[ x0 ][ y0 ][ cIdx ] | ae(v) |
| ... | |
| } | |

Referring to Table 3 above, when the current transform block size log 2TrafoSize is the same as the size of a smallest transform block log 2_skipTrafoSize_min referred to at the time of determining whether to skip the inverse transformation process, a flag transform_skip_flag that indicates whether to perform the inverse transformation on the current transform block may be read. When the process is described in more detail, in the case where the transform skipping is enabled (that is, transform_skip_enabled_flag=1) and the transformation and the quantization are not bypassed for each CU (that is, cu_transquant_bypass_flag=0), it is checked whether the current transform block size log 2TrafoSize and the size of a smallest transform block log 2_skipTrafoSize_min referred to at the time of determining whether to skip the transformation process are the same as each other. Here, when the current transform block size log 2TrafoSize is the same as the size of a smallest transform block log 2_skipTrafoSize_min referred to at the time of determining whether to skip the inverse transformation process, the decoder may read the flag transform_skip_flag that indicates whether transform is performed on the current transform block. When a value of the flag transform_skip_flag is 1, the inverse transformation may be skipped. When the value of the flag transform_skip_flag is 0, the inverse transformation may be performed.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

It will be appreciated that various embodiments of the present invention have been described herein for purposes of illustration, and that various modifications, changes, substitutions may be made by those skilled in the art without departing from the scope and spirit of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

What is claimed is:

1. A method of decoding an image, comprising:
generating a prediction block for a current block;
receiving information of a first block size, wherein the information of the first block size is determined by an encoder, and wherein whether a skip of a transform process is applicable is determined based on a comparison of the information of the first block size with a current block size;
decoding information indicating whether the skip of the transform process is applied, in response to the comparison of the information of the first block size with the current block size representing that the skip of the transform process is applicable;
determining whether to perform an inverse transform on the current block based on the decoded information indicating whether the skip of the transform process is applied;
performing the inverse transform on the current block to generate a residual block for the current block;
reconstructing the current block based on the prediction block and the residual block; and
applying filtering on the reconstructed current block,
wherein the prediction block is generated by performing intra prediction, and
wherein the filtering comprises either one or both of deblocking filtering and a-sample adaptive offset (SAO) filtering.

2. The method of claim 1, wherein in response to the decoded information indicating that the transform process is not performed, the inverse transform on the current block is skipped.

3. The method of claim 1, wherein in response to the decoded information indicating that the transform process is performed, the inverse transform on the current block is performed.

4. The method of claim 1, wherein in response to a value of transform_skip_flag being 1, the transform process is not performed and is skipped on the current block, and in response to the value of transform_skip_flag being 0, the transform process is performed on the current block.

5. The method of claim 4, wherein the information indicating whether the skip of the transform process is applied comprises a flag indicating whether to perform the inverse transform on the current block based on the information of the first block size.

6. The method of claim 1, further comprising performing an inverse transform on the current block according to the current block size, in response to the current block size satisfying a condition in which the skip of the transform process is not applied.

7. The method of claim 6, wherein the skip of the transform process is applied when the current block size is larger than 4×4 pixels.

8. An apparatus to decode an image, comprising:
at least one processor configured to
generate a prediction block for a current block,
decode information of a first block size and information indicating whether a skip of a transform process is applied, wherein the information of the first block size is determined by an encoder, and wherein whether the skip of the transform process is applicable is determined based on a comparison of the information of the first block size with a current block size,
determine whether to perform an inverse transform on the current block based on the decoded information indicating whether the skip of the transform process is applied,
perform the inverse transform on the current block to generate a residual block for the current block,
reconstruct the current block based on the prediction block and the residual block, and
apply filtering on the reconstructed current block,
wherein the prediction block is generated by performing intra prediction, and
wherein the filtering comprises either one or both of deblocking filtering and sample adaptive offset (SAO) filtering.

9. The apparatus of claim 8, wherein the skip of the transform process is applied when the current block size is larger than 4×4 pixels.

10. A method of encoding an image, comprising:
generating a prediction block for a current block;
generating a residual block for the current block based on the prediction block;
encoding the residual block;
decoding the encoded residual block;
reconstructing the current block based on the prediction block and the decoded residual block; and
applying filtering on the reconstructed current block,
wherein the prediction block is generated by performing intra prediction,
wherein the filtering comprises either one or both of deblocking filtering and sample adaptive offset (SAO) filtering, and
wherein the encoding of the residual block comprises
determining information of a first block size, wherein whether a skip of a transform process is applicable is determined based on the information of the first block size compared with a current block size;
determining whether to apply the skip of the transform process on the current block based on a comparison of the information of the first block size with a current block size; and
performing a transform on the current block to encode the residual block.

11. The method of claim 10, further comprising encoding the information indicating whether the skip of the transform process is applied to the current block.

12. The method of claim 10, wherein in response to a value of transform_skip_flag being 1, the transform process is not performed and is skipped on the current block, and in response to the value of transform_skip_flag being 0, the transform process is performed on the current block.

13. The method of claim 11, wherein in response to a determination that the skip of the transform process is applied to the current block, the information indicating whether the skip of the transform process is applied to the current block indicates that the transform on the current block is skipped.

14. The method of claim 11, wherein in response to a determination that that the skip of the transform process is not applied to the current block, the information indicating whether the skip of the transform process is applied to the current block indicates that the transform on the current block is performed.

15. The method of claim 13, further comprising performing the transform on the current block according to the current block size, in response to the current block size satisfying a condition in which the skip of the transform process is not applied.

16. The method of claim 12, wherein the information indicating whether the skip of the transform process is applied comprises a flag indicating whether to perform the transform on the current block based on the information of the first block size.

17. The method of claim 16, wherein the skip of the transform process is applied when the current block size is larger than 4×4 pixels.

18. An apparatus to encode an image, comprising:
at least one processor, configured to
generate a prediction block for a current block,
generate a residual block for the current block based on the prediction block,
encode the residual block,
decode the encoded residual block,
reconstruct the current block based on the prediction block and the decoded residual block, and
apply filtering on the reconstructed current block,
wherein the prediction block is generated by performing intra prediction,
wherein the filtering comprises either one or both of deblocking filtering and sample adaptive offset (SAO) filtering, and
wherein the encoding of the residual block comprises
performing a transform on the current block based on information indicating whether a skip of a transform process is applied, and
encoding information of a first block size and the information indicating whether the skip of the transform process is applied, wherein whether the skip of the transform process is applicable is determined based on a comparison of the information of the first block size with a current block size.

19. The apparatus of claim 18, wherein the skip of the transform process is applied when the current block size is larger than 4×4 pixels.

* * * * *